United States Patent [19]
Morris

[11] Patent Number: 5,256,055
[45] Date of Patent: Oct. 26, 1993

[54] BLOWPIN WITH SELF ALIGNING SHEAR RING

[75] Inventor: Terry L. Morris, Jackson, Mich.

[73] Assignee: Allied Tool Inc., Michigan Center, Mich.

[21] Appl. No.: 989,756

[22] Filed: Dec. 14, 1992

[51] Int. Cl.⁵ .................................. B29C 49/50
[52] U.S. Cl. ........................... 425/527; 425/531; 425/535
[58] Field of Search .............. 425/527, 531, 535, 536

[56] References Cited

U.S. PATENT DOCUMENTS

| | | | |
|---|---|---|---|
| 3,531,556 | 9/1970 | Mehnert | 425/531 X |
| 3,711,233 | 1/1973 | Uhlig | 425/535 X |
| 4,187,070 | 2/1980 | Martin, Jr. | 425/527 X |
| 4,497,623 | 2/1985 | Beuscher | 425/527 X |
| 4,631,020 | 12/1986 | Frankenberg et al. | 425/527 |

Primary Examiner—Richard L. Chiesa
Attorney, Agent, or Firm—Beaman & Beaman

[57] ABSTRACT

A blowpin assembly for blow molding apparatus wherein the assembly utilizes a molded article shear ring cooperating with a mold ring opening to shear the neck of the molded article following the molding process. The shear ring is mounted upon the blowpin assembly for limited radial and axial movement thereto for automatically aligning itself with the mold opening during shearing.

1 Claim, 1 Drawing Sheet

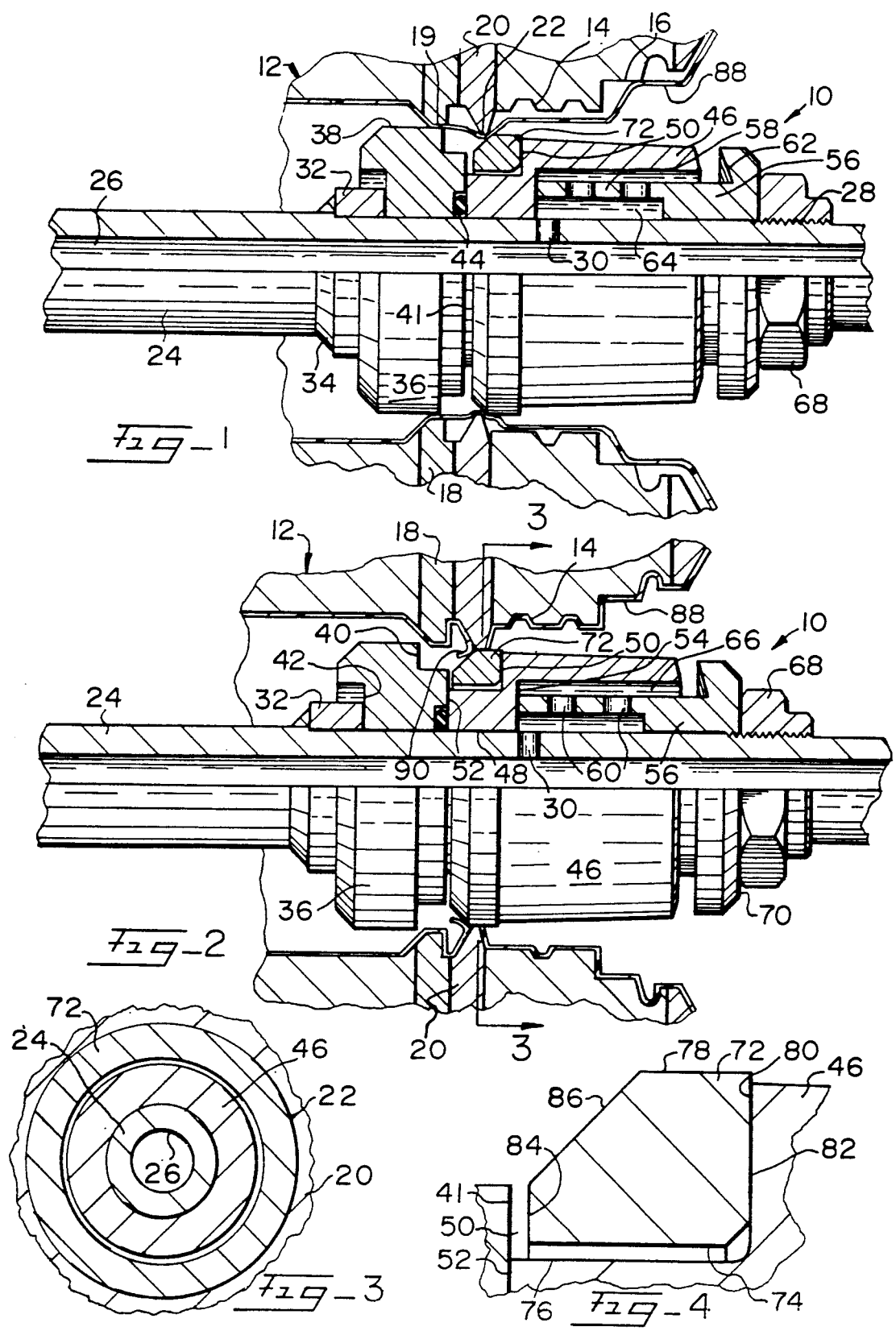

BLOWPIN WITH SELF ALIGNING SHEAR RING

BACKGROUND OF THE INVENTION

1. Field of the Invention

The invention pertains to blow molding apparatus, and particularly the blowpin assembly utilizing a shearing edge for shearing the neck of the molded article at the termination of the molding process.

2. Description of the Related Art

During a blow molding process wherein a hollow article is formed by expanding a synthetic plastic material against the surfaces of the mold cavity by compressed air, a blowpin assembly is utilized to seal the neck of the article being formed, inject the air into the article during molding, and sever or trim the neck of the finished molded article to permit release of the article from the mold.

In most blow molding operations, bottles, or the like, are being formed, and the blowpin assembly is inserted within the mold within the synthetic plastic blank which is to be inflated and formed. The mold neck portions are radially brought into position in opposed radial relationship to the blowpin assembly, and the blowpin assembly includes an air seal which cooperates with the mold neck to restrict the escape of air from the mold cavity during the inflation process. After molding, the blowpin assembly is axially withdrawn from the molded article, and the assembly includes an annular shear edge which cooperates with a circular shear opening defined on the mold neck forming parts to sever the molded article during the withdrawal of the blowpin assembly. Accordingly, upon the opening of the primary mold cavity and neck portions, the formed article may be readily removed.

Blow molding processes are used to form milk bottles, detergent bottles and other receptacles formed by high production blow molding processes, and the continual wear imposed upon the blowpin assembly shearing edge as it cooperates with the mold opening to shear the article causes the shear edge to rapidly wear and dull, requiring frequent replacement and sharpening. Such wear occurring at the blowpin assembly shear edge is a primary reason for blow molding process down-time and maintenance, and as the dulling of the shear edge of the blowpin assembly will result in ragged bottle neck edges and prevent proper release of the formed bottle or receptacle from the mold, it is of utmost importance that effective and clean shearing of the molded article occur as the blowpin assembly is withdrawn from the mold cavity.

Heretofore, the need to terminate the molding process for replacement of the blowpin assembly shearing edge has been considered a necessary deficiency with the apparatus, and operators of blow molding apparatus have lived with the expense of frequently replacing the blowpin assembly in order to have a sharp and effective shearing edge.

OBJECTS OF THE INVENTION

It is an object of the invention to provide a blowpin assembly for blow molding apparatus having shearing capabilities which require significantly less maintenance and replacement than blowpin assemblies presently in use.

Another object of the invention is to provide a blowpin assembly for blow molding apparatus wherein the shearing edge is defined upon a separate shearing ring which may be replaced and resharpened separately from the other blowpin assembly components thereby reducing maintenance expenses.

An additional object of the invention is to provide a blowpin assembly for blow molding apparatus wherein the shearing edge defined on the assembly is formed on a separate annular ring supported on the assembly for a limited radial and axial movement thereto whereby the shear ring "floats" with respect to the blowpin assembly and will automatically self align with the cooperating mold shearing opening during article shearing, thereby reducing shear edge wear and resulting in a clean effective sheared edge.

Yet a further object of the invention is to provide a blowpin assembly for blow molding apparatus wherein the shearing edge of the assembly is defined upon a separate shear ring formed of wear resistant material and the shear ring is self aligning with respect to the mold shear opening, and the shear ring is easily assembled and retained upon the blowpin assembly adding little cost to the assembly over and above that of conventional blowpin construction.

SUMMARY OF THE INVENTION

A blowpin assembly for insertion into the cavity of a blow molding machine includes a tubular stem having an air passage formed therein, annular circular air seals which restrict the flow of air through the neck of the mold cavity, and a shearing edge is defined upon one of the seals which cooperates with a circular mold opening during withdrawal of the blowpin to shear the molded article.

The innermost seal mounted upon the blowpin includes an annular recess intersecting the seal periphery, and also intersecting the outermost seal end. Within this recess, an annular shear ring is mounted. The shear ring includes a forward facing circular edge for cooperating with the mold shearing opening, and the cross sectional dimension of the shear ring is substantially of lesser mass and dimension than the mass and size of the associated seal.

The seal recess base includes a circular surface of a diameter less than that of the seal ring bore mounted thereon whereby limited radial displacement between the seal ring and the associated recess and recess base surface is possible. In an equivalent manner, the axial dimension of the seal recess is slightly greater than the axial dimension of the seal ring wherein the seal ring is capable of limited axial displacement within the seal recess. Such dimensional clearances cause the seal ring to "float" within the seal recess and permit the seal ring, and its cutting edge, to automatically self-align with the mold shear opening as the blowpin assembly is withdrawn from the mold cavity.

The seal in which the seal ring recess is defined is maintained upon the blowpin by a diverter which, in turn, is forced against the seal by a nut threaded upon the blowpin. An annular air seal axially fixed on the blowpin is engaged by the seal supporting the shear ring as the nut is tightened, and in this manner, the shear ring is restrained within its recess during the assembly of the blowpin assembly parts.

Preferably, the shear ring is provided with a conical forward surface converging in a forward direction with respect to the movement of blowpin assembly during shearing, and this conical surface aids in the self alignment of the shear ring with respect to the mold opening during shearing.

BRIEF DESCRIPTION OF THE DRAWINGS

The aforementioned objects and advantages of the invention will be appreciated from the following description and accompanying drawings wherein:

FIG. 1 is a side elevational view, partially diametrically sectioned, of a blowpin assembly in accord with the invention as located within a blow molding cavity, the components being illustrated in the position during molding, FIG. 2 is an elevational partially sectioned view similar to FIG. 1 illustrating the blowpin assembly in a partially withdrawn position shortly after shearing of the neck of the molded article has taken place, FIG. 3 is an elevational sectional view taken along Section 3—3 of FIG. 2, and FIG. 4 is an enlarged elevational sectional view of the shear ring and associated components.

DESCRIPTION OF THE PREFERRED EMBODIMENT

With reference to the drawings, the blowpin assembly is generally indicated at 10, and the blowpin assembly is used in conjunction with the blow molding mold 12. The mold 12 includes a thread recess 14 defining the threads of the neck of a receptacle, for instance, to be molded, and the mold includes a neck recess for forming the neck of the molded article. The mold 12 further includes an annular throat plate 18 having a circular opening 19 for cooperating with the blow pin assembly air seal, as later described. Further, the mold 12 includes the shear plate 20 which defines the circular shear opening 22. Usually, the mold 12, and its associated components, constitute radially movable segments or portions wherein the mold cavity is defined upon the mold portions being closed, and upon the mold portions retracting to an open position the molded article may be removed from the cavity. The aforedescribed features of the mold 12 are conventional, and form no part of the present invention.

The blowpin assembly 10 includes the tubular pin 24 having a coaxial air passage 26. At its inner region the pin 24 is threaded at 28, and radial air holes 30 establish communication through the pin as later described.

An annular stem 32 in the form of a collar is welded to the pin 24 at 34 as to be permanently affixed to the pin.

The air seal 36 is of a circular configuration defining a cylindrical outer surface 38 adapted to cooperate with the throat plate opening 19 so as to define a seal to prevent the escape of air from the mold cavity during blowing. The air seal 36 is relieved at 40, and the inner end 41 of the air seal 36 is disposed at right angles to the longitudinal axis of the air seal. At its outer end, the air seal 36 is provided with a recess surface 42 which engages the stem 32, and in this manner the stem axially positions the air seal 36 upon the pin 24. An O-ring seal 44 is located within a recess within the air seal inner end surface 41.

An annular tapered air seal 46 is slidably mounted upon the pin 24 inwardly of the air seal 36. The seal 46 includes an inwardly tapered conical outer surface, and a cylindrical bore 48 slidably mounted on the exterior of the pin 24. An annular recess 50 defined in the outer end of the seal 46 receives the shear ring, as later described.

The seal 46 includes an end surface 52 which directly abuts against the air seal end 41, and the seal 46 includes an interior recess as defined by recess end 54.

A tubular diverter 56 is slidably mounted upon the pin 24 and includes a tubular section 58 having an end which abuts against the seal recess end 54. A plurality of radially extending ports 60 are defined in the diverter tubular section 58, and an air baffle surface 62 obliquely oriented to the length of the diverter is defined thereon.

The difference in dimension of the pin 24 and the tubular section 58 defines an annular space 64 therebetween, FIG. 1, and the difference in dimension between the outer surface of the section 58 and the recess of the seal 46 defines an annular space 66, FIG. 2. Accordingly, compressed air within the pin air passage 26 passes into the space 64 through ports 30, and the air within chamber 64 passes into space 66 through ports 60, and the surface 62 diverts the air into the cavity of the mold 12.

A nut 68 is threaded upon the blowpin threads 28 and bears against the inner end 70 of the diverter 56 causing the left end of the diverter to engage the seal recess surface 54 forcing the seal end 52 into engagement with the air seal end surface 41. In this manner, the nut 68 maintains the air seal 36, seal 46 and diverter 56 in a fixed axial relationship upon the pin 24.

With reference to FIG. 4, an annular shear ring 72 is located within the recess 50 defined in the tapered air seal 46. The shear ring 72 is preferably formed of a high grade tool steel, but could be formed of harder material such as carbide or the like, having high wear resistant characteristics. The shear ring 72 includes a cylindrical bore 74 disposed in opposed radial relationship to the cylindrical base surface 76 defining the recess 50. The outer dimension of the shear ring 72 is formed by cylindrical surface 78, and the inner end 80 of the shear ring is in opposed engageable relationship to the recess end surface 82 of recess 50. The outer end of the shear ring 72 is defined by the surface 84, and a conical beveled surface 86 is defined on the forward end of the shear ring intersecting the end 84 and the outer surface 78.

As will be readily appreciated from FIG. 4, the shear ring diameter 74 is greater than the diameter of the recess base surface 76 providing radial clearance between these surfaces and permitting a limited radial adjustment or movement of the shear ring 72 relative to the recess 50 and seal 46. Further, the distance between the shear ring ends 80 and 84 is less than the axial dimension between the recess end 82 and the seal end 52. Accordingly, even though the air seal end 41 extends radially beyond recess surface 76 as to locate the surface 41 in axial alignment with the shear ring end 84, the difference in axial dimension between the shear ring 72 and the recess 50 permits a limited axial movement of the shear ring 72 within the recess 50.

During molding, the wall of the synthetic plastic blank 88 which will form the molded bottle is located as shown, FIG. 1, interposed between the blowpin assembly 10 and the mold 12. The throat plate opening 19 will be disposed close to the air seal surface 38 restricting air flow from the cavity of the mold 12, and the injection of high pressure air into the pin 24 through the bore 26, and hence into the mold cavity through ports 30 and 60 will force the bottle material 88 into the cavities of the mold as shown in FIG. 2.

After the article has been expanded into the mold 12 and the final form achieved, and sufficient cooling has occurred to maintain the molded bottle form, the blowpin assembly 10 is moved to the left, FIG. 2, to, at least partially, remove the blowpin from the mold cavity. Such movement of the blowpin assembly 10 will cause the shear ring oblique surface 86 to engage the synthetic plastic material located on the shear plate 20 adjacent the plate opening 22, and such action will radially align the shear ring 72 with the axis of the shear plate opening 22 due to the radial "floating" support of the shear ring 72 upon the seal 46. Further, if the axes of the opening 22 and the pin 24 should be slightly misaligned, i.e. not parallel, the difference in axial dimension between the shear ring 72 and the seal recess 50 will permit the shear ring to slightly tilt to accommodate and align itself with such a non-parallel relationship.

As the blowpin assembly 10 continues to move to the left, FIG. 2, the close reception of the shear ring outer surface 78 into the shear plate opening 22 will shear the synthetic plastic material to form the displaced flashing 90 and define an attractive clean bottle edge. Thereupon, the segments of the mold 12 may be opened and the formed bottle removed from the mold cavity.

As described above, the "floating" support of the shear ring 72 within the seal recess 50 permits the shear ring to quickly and automatically align itself with the mold shear plate opening 22 during the shearing of the bottle material as shown in FIG. 2, and such self alignment assures even pressures and wear upon the shear ring providing a long and effective life wherein the shear ring is capable of forming clean sheared article edges for many more cycles than is possible to achieve with blowpin assemblies having fixed non-self aligning shearing edges.

It is appreciated that various modifications to the inventive concepts may be apparent to those skilled in the art without departing from the spirit and scope of the invention.

I claim:

1. In a blowpin assembly for blow molding apparatus wherein the blowpin assembly is located within the neck of the molded article, the assembly including an elongated tubular pin having an air passage defined therein and an annular shearing ring for cooperation with a circular mold opening having an axis to shear the molded article, the improvement comprising, a first annular air seal mounted on the pin adjacent a second annular air seal mounted on the pin having a radial shoulder engaging said first air seal, an annular recess defined on said first air seal having an annular base surface, an annular shear ring mounted within said recess having an inner bore surface of a configuration corresponding to the configuration of said recess base surface and circumscribing said recess base surface, the diametrical dimension of said recess bore surface being less than the diametrical dimension of said shear ring bore surface whereby said shear ring will automatically radially align itself with the circular mold opening during article shearing, said annular recess having a first axial dimension defined by a radial shoulder formed on said first air seal and said second air seal radial shoulder, said shear ring having a second axial dimension less than said first axial dimension permitting limited tilting of said shear ring within said recess to aid in alignment of said shear ring with the circular mold opening, said shear ring having a longitudinal axis, an outer cylindrical surface, and a front face with respect to the direction of shear ring movement during shearing, said front face being obliquely related to said shear ring axis having a minimum dimension adjacent said second air seal and a maximum dimension equal to said shear ring outer cylindrical surface, said oblique front face directly intersecting said shear ring outer cylindrical surface.

* * * * *